US008990316B1

(12) United States Patent
Feinstein

(10) Patent No.: US 8,990,316 B1
(45) Date of Patent: Mar. 24, 2015

(54) IDENTIFYING MESSAGE DELIVERABILITY PROBLEMS USING GROUPED MESSAGE CHARACTERISTICS

(75) Inventor: Jonathan Feinstein, Sebastopol, CA (US)

(73) Assignee: Amazon Technologies, Inc., Seattle, WA (US)

( * ) Notice: Subject to any disclaimer, the term of this patent is extended or adjusted under 35 U.S.C. 154(b) by 542 days.

(21) Appl. No.: 12/940,398

(22) Filed: Nov. 5, 2010

(51) Int. Cl.
*G06F 15/16* (2006.01)
*H04L 12/58* (2006.01)

(52) U.S. Cl.
CPC ............ *H04L 51/18* (2013.01); *H04L 12/5885* (2013.01); *H04L 51/30* (2013.01); *H04L 51/34* (2013.01); *H04L 51/02* (2013.01); *H04L 12/5805* (2013.01); *H04L 12/5875* (2013.01)
USPC ....................................................... 709/206

(58) Field of Classification Search
CPC ......... H04L 51/34; H04L 51/30; H04L 51/02; H04L 51/18; H04L 12/5805; H04L 12/5875; H04L 12/5885
USPC ....................................................... 709/206
See application file for complete search history.

(56) References Cited

U.S. PATENT DOCUMENTS

| | | | |
|---|---|---|---|
| 6,965,926 B1 * | 11/2005 | Shapiro et al. ................ | 709/219 |
| 7,072,947 B1 * | 7/2006 | Knox et al. ................... | 709/217 |
| 7,574,478 B2 * | 8/2009 | Mittelstaedt et al. ......... | 709/206 |
| 7,603,425 B2 * | 10/2009 | DiPlacido et al. ............ | 709/206 |
| 7,680,892 B2 * | 3/2010 | Knox et al. ................... | 709/206 |
| 7,739,337 B1 * | 6/2010 | Jensen .......................... | 709/206 |
| 7,908,328 B1 * | 3/2011 | Hulten et al. ................. | 709/206 |
| 2002/0078158 A1 * | 6/2002 | Brown et al. ................. | 709/206 |
| 2002/0104026 A1 * | 8/2002 | Barra et al. ................... | 713/202 |
| 2002/0169835 A1 * | 11/2002 | Paul et al. .................... | 709/206 |
| 2003/0158905 A1 * | 8/2003 | Petry et al. ................... | 709/206 |
| 2005/0044150 A1 * | 2/2005 | Kaminsky et al. ............ | 709/206 |
| 2005/0228899 A1 * | 10/2005 | Wendkos et al. ............. | 709/232 |
| 2006/0010215 A1 * | 1/2006 | Clegg et al. .................. | 709/206 |
| 2006/0253537 A1 * | 11/2006 | Thomas ........................ | 709/206 |
| 2006/0265459 A1 * | 11/2006 | Petry et al. ................... | 709/206 |
| 2007/0005713 A1 * | 1/2007 | LeVasseur et al. ........... | 709/206 |
| 2007/0136430 A1 * | 6/2007 | Qureshi et al. ............... | 709/206 |
| 2007/0143407 A1 * | 6/2007 | Avritch et al. ................ | 709/206 |
| 2007/0162587 A1 * | 7/2007 | Lund et al. ................... | 709/223 |
| 2007/0294352 A1 * | 12/2007 | Shraim et al. ................ | 709/206 |
| 2008/0034046 A1 * | 2/2008 | DiPlacido et al. ............ | 709/206 |
| 2008/0034432 A1 * | 2/2008 | Bohannon et al. ............ | 726/23 |
| 2009/0313333 A1 * | 12/2009 | Fanebost et al. ............. | 709/206 |

(Continued)

*Primary Examiner* — Ario Etienne
*Assistant Examiner* — Blake Rubin
(74) *Attorney, Agent, or Firm* — Thomas | Horstemeyer LLC

(57) ABSTRACT

Methods, systems and computer program products are disclosed for identifying a message deliverability problem. In an example system, a source email server divides a plurality of email messages intended for delivery to destination devices using at least two source IP addresses into at least two groups of messages. The source email server outputs each email message in one of the groups through a same one of the source IP addresses and outputs each email message in another one of the groups through a different one of the source IP addresses. Each of the email messages is configured to trigger a response that includes the source IP address of the email message in response to a user opening the email message and/or selecting a hyperlink within the email message. A deliverability analysis module identifies an email message deliverability problem associated with one of the source IP addresses in response to a comparison of the responses across the source IP addresses.

27 Claims, 6 Drawing Sheets

(56) References Cited

U.S. PATENT DOCUMENTS

| | | | |
|---|---|---|---|
| 2010/0011079 A1* | 1/2010 | Hitchcock et al. | 709/206 |
| 2010/0064013 A1* | 3/2010 | Aranzulla | 709/206 |
| 2010/0114691 A1* | 5/2010 | Wu et al. | 705/14.44 |
| 2010/0281008 A1* | 11/2010 | Braunwarth | 707/705 |
| 2011/0184793 A1* | 7/2011 | Bohannon et al. | 705/14.14 |
| 2011/0307496 A1* | 12/2011 | Jones et al. | 707/748 |
| 2012/0016924 A1* | 1/2012 | Farnell et al. | 709/202 |

* cited by examiner

US 8,990,316 B1

IDENTIFYING MESSAGE DELIVERABILITY PROBLEMS USING GROUPED MESSAGE CHARACTERISTICS

BACKGROUND

Electronic mail, also commonly referred to as "email" or "e-mail", can be an important form of communication service available on the Internet. It has been estimated that over 90% of over all email on the Internet is spam. Spam generally refers to email that is unwanted by recipients, while other email is referred to as "legitimate email." As a result, many systems and tools have emerged that attempt to reduce the amount of spam received by a recipient.

Some systems and tools inspect the content of individual emails and selectively block email, such as by dropping (not delivering) email without notifying the sender, bouncing email back to the sender as not deliverable, or redirecting email to a recipient's spam/junk folder. The systems and tools may generate blacklists/whitelists of email server addresses and prevent delivery of any email associated with a blacklisted server while allowing email associated with non-blacklisted servers to pass through, and/or only passing through email that is associated with whitelisted servers. These spam systems and tools can be hosted by email clients residing on individual user computers and/or by Internet Service Providers (ISPs) that filter email before it is delivered to email clients.

Businesses are becoming increasingly concerned that their legitimate email may be inappropriately blocked by spam tools and therefore may not be delivered to the recipient. Legitimate email may be inappropriately blocked as spam due to overreaching spam content filters, as a result of unwitting previous sending of spam on the part of the sender, or as a result of inappropriate reputation seasoning on the part of the sender for the volume of mail they want to send. Businesses are therefore increasingly implementing deliverability monitoring as a way to measure whether their email appears to be reaching customers.

One way to monitor email deliverability is by sending seed (test) emails to seed accounts that have been setup at major ISPs. The seed accounts can then be monitored to determine how many seed emails have properly passed through the associated spam filters and arrived at which accounts. Analysis of which emails made it to which seed accounts may enable a business to identify when an ISP has blacklisted its originating address and/or when email contains content that is being blocked as spam. However, it may not be feasible to create seed accounts at a sufficiently representative number of ISPs that provide email services for desired recipients and, moreover, seed accounts may not be available at non-public ISPs (e.g., private company networks). Moreover, the particular content of the seed email may not adequately model how spam tools will treat actual email and the monitoring of seed email accounts may not identify email deliverability problems in a timely manner.

DETAILED DESCRIPTION

Methods, systems and computer program products are disclosed for identifying message deliverability problems between source and destination devices. In one embodiment, a source email server divides a plurality of email messages into at least two groups of messages. The source email server outputs each email within a group through a single source Internet Protocol (IP) address and outputs each email message in another one of the groups through a different source IP address. Each of the email messages is configured to trigger a response that includes the source IP address of the email message in response to a user opening the email message and/or selecting a hyperlink within the email message. A deliverability analysis module identifies an email message deliverability problem associated with one of the source IP addresses in response to a comparison of the responses across the source IP addresses.

In response to identifying a deliverability problem, the deliverability analysis module may notify an operator to take various actions which may include, for example, removing the identified IP address from a blacklist that is generated/maintained by an ISP and/or email server, adding the identified IP address to a whitelist that is generated/maintained by an ISP and/or email server, and/or changing at least a portion of the email content that is believed to be causing the email to be blocked and/or identified as spam.

For purposes of illustration and explanation only, various embodiments are described herein in the context of identifying email message deliverability problems. However, it will be understood that embodiments may be incorporated into any type of messaging system to identify message delivery problems, such as Short Message Service (SMS) delivery problems and/or Multimedia Message Service (MMS) delivery problems.

Figure 1:
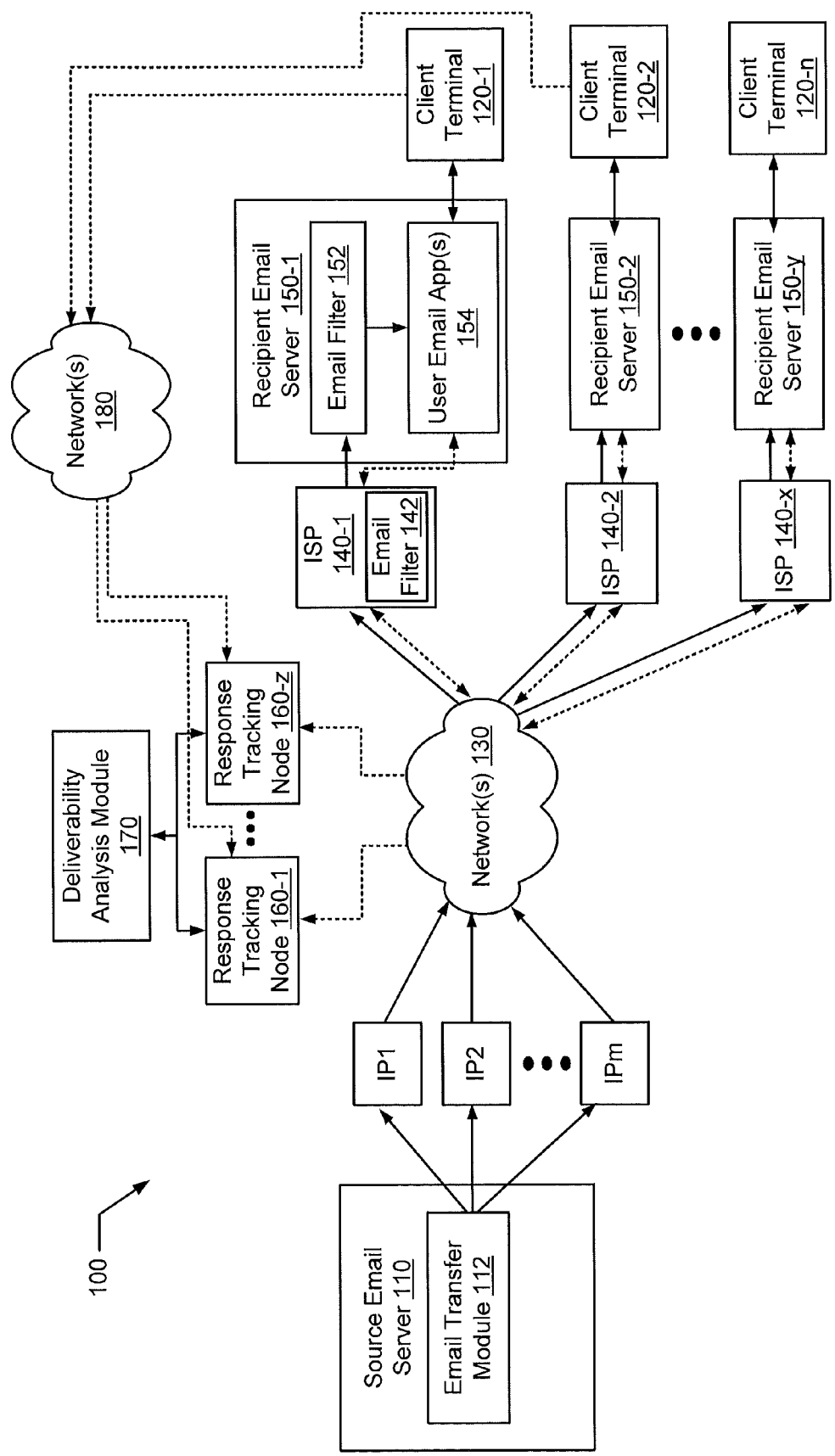
FIG. 1 is a block diagram of systems, devices, methods and computer program products for identifying message delivery problems according to some embodiments described herein.
Figure 2:
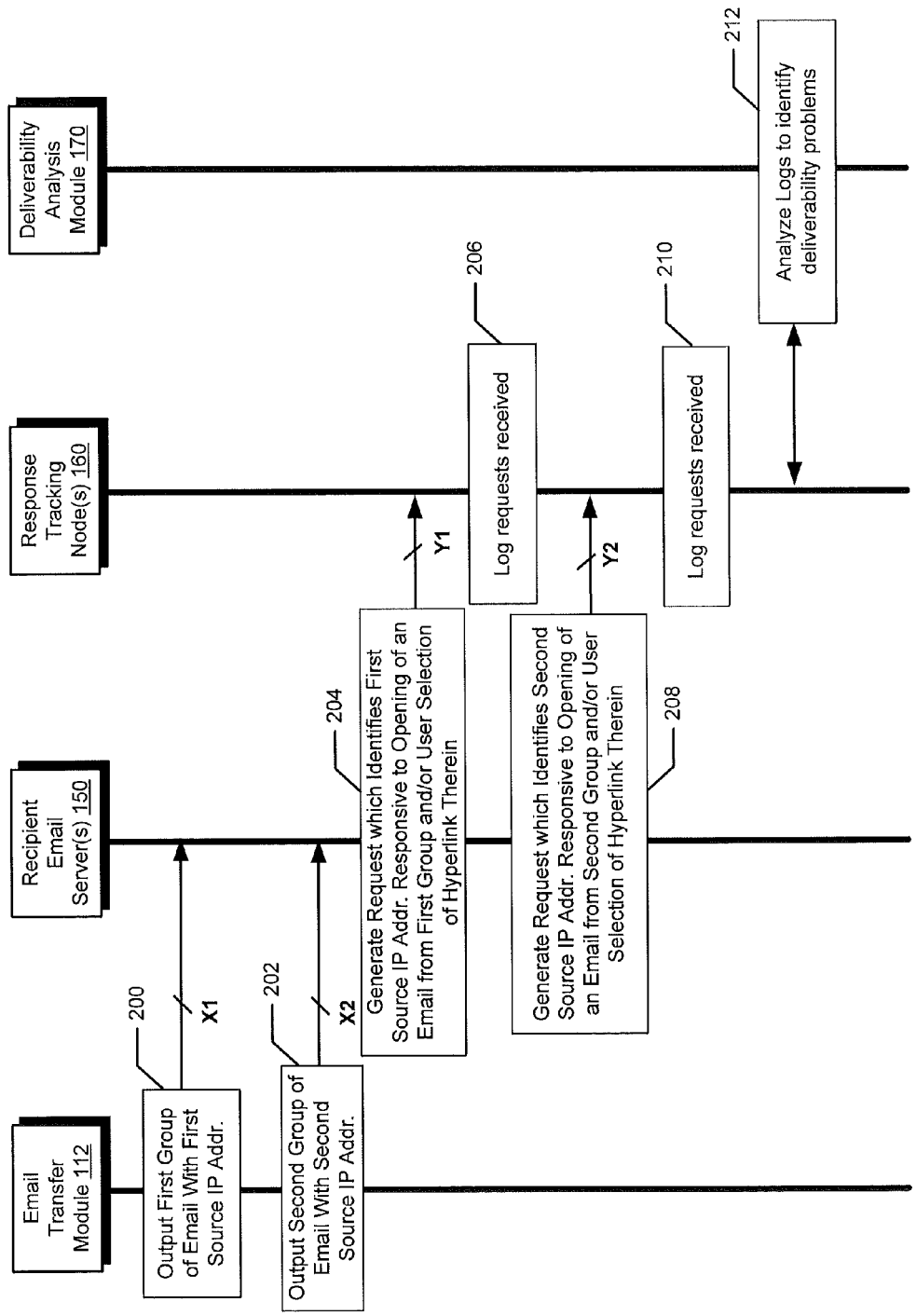
FIG. 2 is a diagram of operations and associated message flows that may be performed by various elements of FIG. 1 to identify message delivery problems according to some embodiments described herein.

Example System Architecture for Deliverability Analysis of Emails Grouped by Source IP Address FIG. 1 is a block diagram of systems, devices, methods and computer program products 100 that identify message delivery problems. FIG. 2 is a diagram of operations and associated message flows that may be performed by various elements of FIG. 1 to group emails by source IP addresses for use in identifying message delivery problems.

Referring to FIGS. 1 and 2, a source email server 110 includes an email transfer module 112 that organizes email, which are intended for delivery to destination devices, into at least two groups of messages. In some instances, an object is embedded in each email message in each of the groups and the object is configured to trigger an event that is uniquely traceable to that group of email messages. In some embodiments, the object embedded in the email is not visible to the recipient (e.g., 1×1 gif, tracking pixel, etc.). In other embodiments, the object embedded in the email is visible to the recipient (e.g., hyperlink, phone number, etc.). Because these events are traceable to the various groups, a problem with delivery of email from one of the groups to at least some of the destination devices may be determined by comparing responses that are received across the groups.

For example, an e-mail sent with the source IP address IP2 can contain an embedded image of URL http://example.com/bug.gif?IP2. Whenever a user opens the e-mail, the image at this URL is requested from a server. The part of the URL after the question mark is ignored by the server for the purpose of determining which file to send, but the complete URL is stored in the server's log file. As a result, the file bug.gif is sent and shown in the e-mail reader/web browser; at the same time, the server stores the fact that the an email that was sent from the IP2 source IP address has been read.

In some embodiments, the email transfer module 112 divides (organizes) the email messages into groups for delivery to destination devices. As discussed above, each email group is associated with a different source IP addresses (shown as IP1 to IPm in FIG. 1) for each of the groups, where "m" is an integer. Thus, each email within a group will contain the same source IP address in the header because, as is known in the art, message headers contain the IP addresses of all of the servers involved in routing that email to the recipient. As shown in FIG. 2, each email message in a first group (e.g., X1 number of emails) may contain the first source IP address, IP1, in its header and is communicated (Block 200) to the recipient email server 150 associated with the destination or "deliver-to" address contained in its header. Similarly, each email message in a second group (e.g., X2 number of emails) may contain the second source IP address, IP2, in its header and is communicated (Block 202) to the recipient email server 150 associated with the destination or "deliver-to" address contained in its header. Although not shown in FIG. 2, additional email messages may be grouped for communication with each email group having a different one of the third through m'th source IP addresses IP3 to IPm.

Accordingly, the source IP address of an email message can be used to identify its association to a particular one of the groups of email messages. The number of message groups can be different than the number of IP addresses, although the number of IP addresses can be at least equal to the number of message groups to avoid communicating more than one group of email messages with the same source IP address.

Although a contiguous sequence of IP addresses (e.g., IP1 IPm) have been illustrated in FIG. 1, gaps may be present between the IP addresses. For example, the IP addresses that are associated with different groups of email messages may be selected from different ranges of addresses (e.g., having different "ORG" identifiers). Selecting IP addresses from different ranges of email messages may increase the likelihood that email messages from one group may pass through email filters that block email messages from another group.

Each email message also has a defined destination address that corresponds to one of recipient email servers 150-1 to 150-y, where "y" is an integer. Each email message may be routed using the destination address in a conventional manner through a network 130 (e.g., a packet switched network) and one of the ISPs 140-1 to 140-x, where "x" is an integer, for receipt by a recipient email server associated with the destination address. A user can operate an email application 154 (e.g., Microsoft Outlook) to access email received by the associated recipient email server.

However, before reaching the user email applications 154, the email messages may be subjected to various email filters, such as the example email filter 142 residing in the ISPs 140-1 to 140-x and/or the email filter 152 residing in the recipient email servers 150-1 to 150-y. Conventional email filters may be configured to inspect the message content of individual email messages and/or any information contained in the header of the email. Based on this inspection, a conventional filter may selectively block delivery of an email message to a recipient based on the content, such as by dropping (not delivering) email messages without reporting to the source email server 110 that the email could not be delivered, bouncing email messages back to the source email server 110 as undeliverable, or redirecting email messages to a recipient's spam folder. An email filter may alternatively or additionally respond to an instruction from a user to block a selected email message and/or may receive instructions from another program that identifies email message content, header information, and/or other characteristics that are to trigger certain email messages to be blocked.

The email filters may additionally or alternatively respond to the content inspection by adding one or more of the source IP addresses IP1 to IPm to a blacklist/whitelist. Any email that originates from the source email server 110 and has a blacklisted source IP address can thereafter be blocked by the email filters 142/152 while other email having non-blacklisted source IP addresses may pass through to the user email applications 154. Alternatively or additionally, any email that originates from the source email server 110 and has a whitelisted source IP address may be allowed to pass through to the user email applications 154 while other email having non-whitelisted source IP addresses can be blocked by the email filters 142/152.

The user email applications 154 may reside in the email servers 150-1 to 150-y and be accessed by a user via one or more client terminals 120-1 to 120-n, where "n" is an integer. However, instead of residing on an email server, one or more of the email applications 154 may reside on one or more of the client terminals 120-1 to 120-n, which may send/receive email messages through the email server(s) 150-1 to 150-y and/or through another network element. Each recipient email server 150-1 to 150-y and/or each client terminal 120-1 to 120-n may include, but is not limited to, a desktop computer, a laptop computer, a tablet, a palmtop, an electronic book reader, a smart phone, gaming console, set-top box, cellular communication terminal, and/or any another electronic device that can utilize an email application residing on an email server and/or on the device itself.

The object embedded in each of the email messages is configured to generate (Blocks 204 and 208) a response, such as a Hypertext Transfer Protocol (HTTP) response, which includes the source IP address of the email message in response to a user opening an email message and/or selecting a hyperlink contained within the email message. The response may comprise an image request that is generated by an email reader and/or web browser hosted on the recipient email server 150 and/or the client terminal 120 in response to the email message being opened by a user. The image request generated by, for example, an email reader and/or web browser hosted on the client terminal 120, request the image data from a server storing the image. In some embodiments, the image data is contained in a Uniform Resource Locator (URL), and includes the source IP address associated with the email message for use by the receiving device to identify from which group of email messages the image request was generated (e.g., from an email within the group sent over IP1 and/or from an email within the group sent over IP2).

For example, as explained above, an e-mail sent with the source IP address IP2 can contain an embedded image of URL http://example.com/bug.gif?IP2. Whenever a user opens the e-mail, the image at this URL is requested from a server. The part of the URL after the question mark is ignored by the server for the purpose of determining which file to send, but the complete URL is stored in the server's log file. As a result, the file bug.gif is sent and shown in the e-mail reader/web browser; at the same time, the server logs the fact that the an email that was sent from the IP2 source IP address has been read.

Alternatively or additionally, each email message may include a user selectable hyperlink that, upon selection, generates a response for content that is communicated to an identified Uniform Resource Identifier (URI) of a device, and includes the source IP address of the email message. The source IP address can be similarly logged at the server that is addressed by the URL In the example shown in FIG. 2, Y1 number of responses are generated in response to users opening email messages and/or selecting hyperlinks in email messages of the first group, and Y2 number of responses are generated by users opening email messages and/or selecting hyperlinks in email messages of the second group. Example responses that contain, for example, image requests or content requests that are generated by the associated email readers/web browsers are illustrated in FIG. 1 by the dashed pathway connections from the user email applications 154 to one or more response tracking nodes 160-1 to 160-z, where "z" is an integer. The nodes 160-1 to 160-z can be configured to log (Blocks 206 and 210) the received responses (i.e., the image requests and/or the content requests), including recording their identified source IP addresses. The nodes 160-1 to 160-z may also generate a timestamp (e.g., time of day, day of week, and/or day of month) in the log that identifies when each response was received. Although a plurality of request tracking nodes have been illustrated in FIG. 4, it is to be understood that the request tracking nodes may be functionally combined into a single hardware element or a single request tracking node may be used.

The nodes 160-1 to 160-z may transmit the requested image data and/or content data back to the user email application 154 and/or web browser that generated the response. Alternatively, the nodes 160-1 to 160-z may operate to forward the responses to a server or other network device that contains the requested image data and/or content data and can respond back to the user email application 154 and/or web browser that generated the response.

Figure 3:
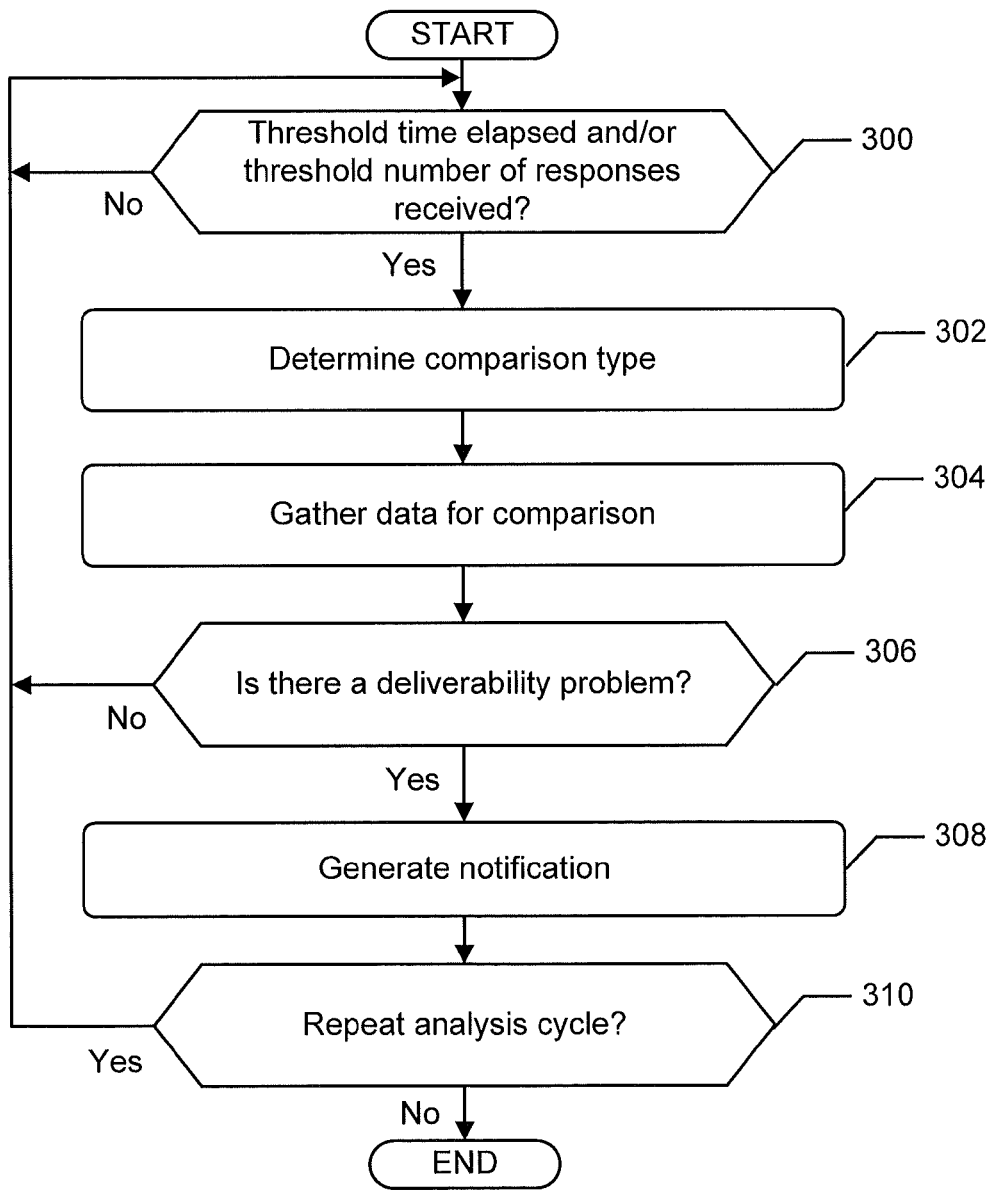
FIG. 3 is a flowchart of operations and methods that may be performed by the deliverability analysis module of FIG. 1 according to some embodiments described herein.

A deliverability analysis module 170 is configured to use the logs generated by the nodes 160-1 to 160-z to identify an email deliverability problem associated with one or more of the source IP addresses IP1 to IPm (Block 212). FIG. 3 is a flowchart of operations and methods that may be performed by the deliverability analysis module 170 to identify an email deliverability problem. Referring to FIGS. 1-3, the module 170 may wait (Block 300) for a threshold time to have elapsed and/or may wait for a threshold number of responses to be logged by the response tracking nodes 160-1 to 160-z since a previous deliverability analysis cycle was carried-out. The threshold time and/or number of responses that triggers the analysis may be defined to be sufficiently high so that a statistical difference between the response metrics across different groups and/or relative to historical values can be more accurately attributed to a deliverability problem instead of arising from normal variability in number of responses that may distort such analysis over shorter time segments. Alternatively, the deliverability analysis operations may be initiated by an operator or may run continuously without operation of the conditions of Block 300.

Upon satisfying Block 300, the deliverability analysis module 170 determines (Block 302) what type of comparison is to be made to identify whether a deliverability problem has occurred. The module 170 may, for example, compare how many responses are received across a plurality of groups and/or may compare how many responses are presently received relative to a historical number of responses that were received, as explained in further detail below.

The module 170 gathers (Block 304) the data that is needed for comparison, such as by reading the logged data from the response tracking nodes 160, by receiving periodic reports containing the logged data from the nodes 160, and/or by retrieving historical data that is to be used in the comparison. The module 170 then uses the gathered data to determine (Block 306) whether an email deliverability problem has occurred and, if so, generates a corresponding notification (Block 308) to an operator. A decision is then made (Block 310) as to whether another cycle of the email deliverability analysis is to be carried out, which may be determined based on whether further responses are being logged by the response track nodes 160-1 to 160-z.

In some embodiments, the deliverability analysis module 170 may identify (Block 306) that a message deliverability problem has occurred with one of the source IP addresses IP1 to IPm in response to a comparison of the logged responses across the source IP addresses IP 1 to IPm, while taking into account the relative number of email messages that were output by the source email server 110 in each of the groups. When there is at least a threshold difference between the number of responses logged for a particular one of the source IP address and how many responses are logged for one or more other source IP addresses, the deliverability analysis module 170 may notify (Block 308) an operator that that there is a deliverability problem with emails flowing through that particular source IP address.

For example, the source email server 110 may organize 20,000 emails into two groups; outputting 10,000 emails through source IP address IP1 (Block 200) and outputting another 10,000 emails through source IP address IP2 (Block 202). The deliverability analysis module 170 can then compare (Block 306) the relative number of resulting responses (e.g., image requests and/or content requests) that are associated with each of the two groups of email to identify a message deliverability problem. When an email filter (e.g., filters 142/152) blacklists source IP address IP2 and does not blacklist source IP address IP1 and/or when a network problem occurs in the pathway of the email messages sent through source IP address IP2 and not in the pathway of the email messages sent through source IP address IP1, substantially more email messages from the first group may reach the intended users than email messages from the second group. Consequently, the deliverability analysis module 170 may identify (Block 306) that substantially more responses were logged for the first group of email messages, which can trigger the email deliverability analysis module 170 to notify (Block 308) an operator that a message deliverability problem has occurred.

Alternatively or additionally, the request tracking node 160 may log the source addresses of the user devices that generated the responses and/or may log other information (e.g., message group identifiers, client identifiers, etc.) that are identified in the responses. The deliverability analysis module 170 may correlate the logged source addresses and/or other information to the groups of email messages that were output from the email transfer module 112 to identify how many responses have been received from each of the groups of email messages. The deliverability analysis module 170 may then compare the responses across the different groups and/or compare the present responses to historical data to identify whether a message deliverability problem has occurred with one or more of groups of messages.

The deliverability analysis module 170 may notify (Block 308) the operator by, for example, transmitting a message to an operations support system or another network element that provides details of the identified deliverability problem. Upon receiving such a message, the operator may take appropriate actions to investigate the problem and take necessary remedial action, if necessary. For example, the operator may investigate whether the identified source IP address has been placed on an ISP's blacklist, an email server, or other network element, and if so, attempt to remove the source IP address from the blacklist and/or add the identified source IP address to a whitelist. In other embodiments, the operator may elect to change at least some of the content of the email message associated with the source IP address having the deliverability problem to avoid certain words, links, addresses, and/or other information contained in the email from causing the email to be flagged as spam by the email filters 142/152.

The analysis of whether a deliverability problem has occurred (Block 306) can include a statistical comparison of present and historical responses so that, for example, variations between a present response rate and a historical response rate over a defined time interval can be used to identify message deliverability problems. Accordingly, the deliverability analysis module 170 may compare (Block 306) how many responses are received for at least one of the groups of messages to a historical number of message responses that were received during an earlier at least substantially non-overlapping time duration, while taking into account the relative number of email messages that were output by the email transfer module 112 presently versus historically. The presently observed response data can be included in the historical data so that one or more future analysis cycles can be responsive to the present data and/or changing trends in the data over time.

The deliverability analysis module 170 may additionally or alternatively compare (Block 306) how many message responses are received for at least one of the groups of messages to a historical number of message responses that were received during substantially the same time of an earlier day and/or during the same day of an earlier week, while taking into account the relative number of email messages that were output by the email transfer module 112 presently versus historically. The presently observed response data can be included in the historical data so that one or more future analysis cycles can be responsive to the present data and/or changing trends in the data over time. The accuracy of the analysis may thereby be improved because, for example, the present response metrics are compared to what is expected to be similar historical response metrics so the differences therebetween may be more accurately attributed to a deliverability problem as opposed to normal response variations throughout a day and/or throughout a week due to user email access and response patterns, etc.

The percentage of responses that have been historically received in response to sending email messages to some ISPs (e.g., percentage based on number of email messages sent divided by number of responses received) may be substantially different than the percentage of responses that have been historically received in response to sending email messages to certain other ISPs. These differences may be due to, for example, characteristics of users who typically access email through various different types of ISPs (e.g., users who access email through ISPs serving corporate email servers versus other users who access email through ISPs serving personal email servers). The presently observed response data can be included in the historical data so that one or more future analysis cycles can be responsive to the present data and/or changing trends in the data over time. Accordingly, the deliverability analysis module 170 may compare (Block 306) how many responses are received for one or more of the groups of messages to a historical number of response that were received from one or more of the same ISPs. This comparison may improve the accuracy by which observed differences are properly attributable to message delivery problems instead of normal response rate variations between ISPs.

Similarly, the percentage of responses that have been historically generated from some users (e.g., recipient email servers) may be substantially different than those generated from some other users due to, for example, different rates of email opening and/or hyperlink selection between individual users. Accordingly, the deliverability analysis module 170 may compare (Block 306) responses received for at least one of the groups of messages to a historical number of responses that were received from at least some of the same users, while taking into account the relative number of email messages that were output by the source email server 110 presently versus historically. This comparison may also improve the accuracy with which observed differences are properly attributable to message delivery problems instead of normal response rate variations that have been historically observed from different users.

When comparing (Block 306) response rates to determine whether there is a deliverability problem, the analysis module 170 may take into consideration how similar or different the content of the present email messages is to the email messages that generated the historical data. For example, the present email messages may comprise a marketing campaign or other solicitation/informational/purchase confirmation type of email. When comparing the response rate recorded by the nodes 160 for this group of campaign emails to historical data, the module 170 may, in some embodiments, want to limit its comparison to historical data that was generated for a similar type of email (e.g., another group of campaign emails). This way, response rates will be compared (current and historical) for similar types of emails. This will prevent comparing response rates against other types of emails that may historically have higher/lower response rates unrelated to deliverability problems. For example, purchase order confirmation email messages may traditionally have a substantially higher response rate than campaign related email messages for reasons other than deliverability (e.g., users historically select a "track my package" hyperlink in an order confirmation email more often than opening a campaign related advertisement). The presently observed response data can be included in the historical data so that one or more future analysis cycles can be responsive to the present data and/or changing trends in the data over time.

Example Deliverability Analysis of Emails Grouped by URI/URL Request Address

In some other embodiments, the email transfer module 112 divides (organizes) email messages that are intended for delivery to destination devices into at least two groups of messages. In contrast to the embodiments of FIG. 2, the email messages in each of the present groups are configured to trigger generation of responses that contain image requests that are directed to different URLs and/or content requests that are directed to different URIs. The deliverability analysis module 170 can therefore compare the requests that are received at the different URLs and/or URIs to identify when there is a deliverability problem associated with one of the groups of email messages.

Figure 4:
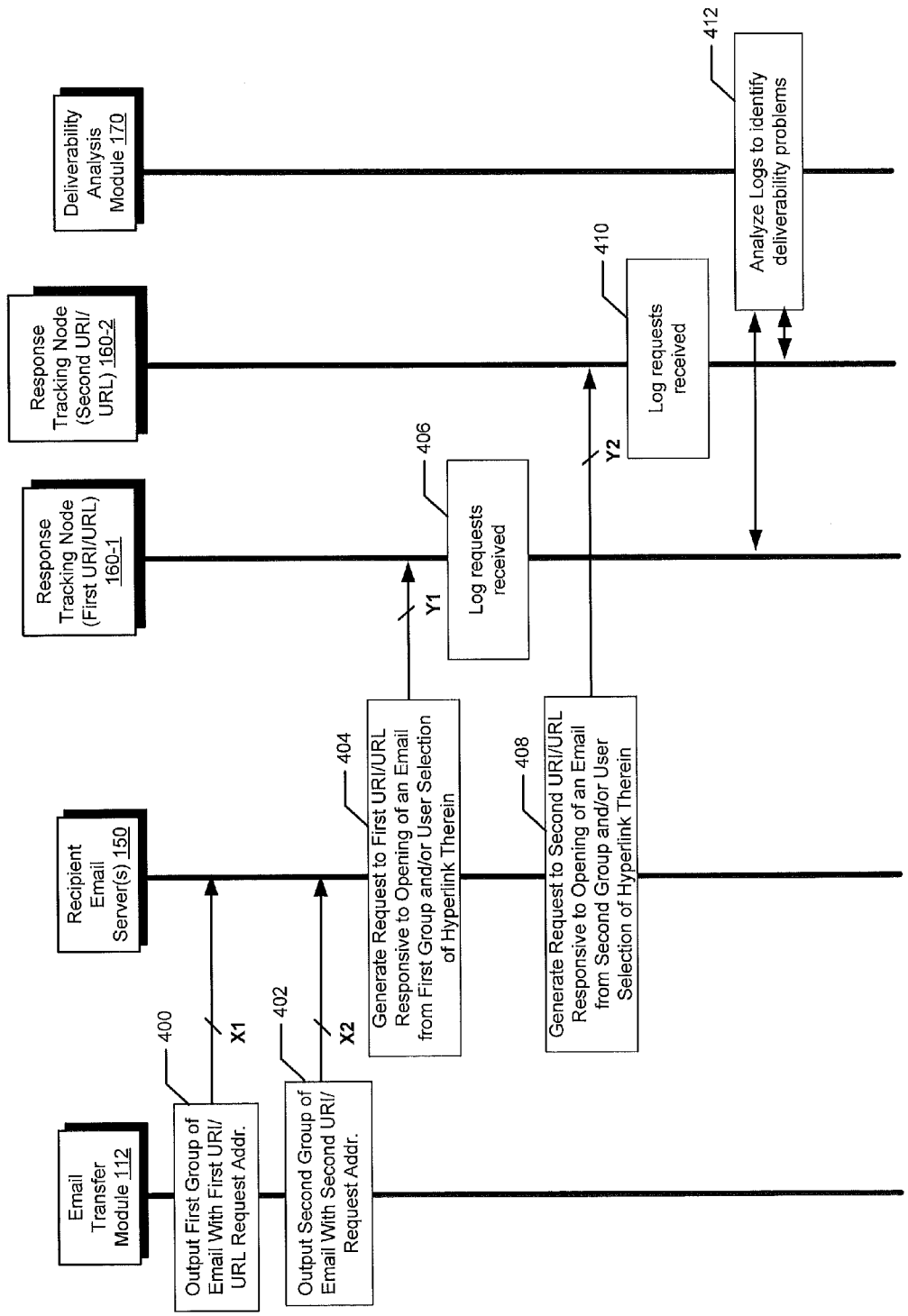
FIG. 4 is a diagram of operations and associated message flows that may be performed by various elements of FIG. 1 to identify message delivery problems according to another embodiment described herein.

FIG. 4 is a diagram of operations and associated signal flows that may be performed to identify message delivery problems by comparison of the responses that are received at different URLs and/or URIs. The embodiments that are described below for FIG. 4 may be used as an alternative to, or in addition to, the embodiments that are described above for FIG. 2. Referring to FIGS. 1 and 4, the email transfer module 112 divides the email messages into groups for delivery to the recipient email servers 150 with image requests that are directed to different URLs and/or with content requests that are directed to different URIs.

Each email message in a first group (e.g., X1 number of emails) may be communicated (Block 400) with image requests directed to a first URL and/or content requests directed to a first URI. Each email message in a second group (e.g., X2 number of emails) may be communicated (Block 402) with image requests directed to a second URL and/or content requests directed to a second URI. Although not shown, additional email messages may be grouped for communication, where each email group has a different image/content request to a different URL/URI. Accordingly, the URL address and/or URI address at which the requests are received can be used to identify its association to a particular one of the groups of email messages.

In response to a user opening an email message in the first group an image request is generated (block 404) containing the first URL, and in response to a user opening an email message in the second group an image request is generated (block 408) containing the second URL. Alternatively or additionally, in response to a user selecting a hyperlink in an email message in the first group a content request is generated (block 404) containing the first URI provided in the hyperlink, and in response to a user selecting a hyperlink in an email message in the second group a content request is generated (block 408) containing the second URI provided in the hyperlink.

The tracking nodes 160-1 to 160-z can be configured to log (Blocks 406 and 410) how many image requests are received at the first and second URLs and/or how many content requests are received at the first and second URIs. The nodes 160 may transmit the requested image data and/or content data back to the user email application 154 and/or web browser that generated the request. Alternatively, the nodes 160 may operate to forward the requests to a server or other network device that contains the requested image data and/or content data and which can respond back to the user email application 154 and/or web browser that generated the request.

The deliverability analysis module 170 is configured to use the logged data to identify a problem with deliverability of email messages associated with one or more of the groups (Block 412). The deliverability analysis may be carried out as described above regarding, for example, Block 212 of FIG. 2 and Block 306 of FIG. 3, except that instead of, or in addition to, associating the responsive image requests/content requests to the various groups of email using the identified source IP addresses identified by the requests, the associations can now be made based on which of the URL addresses and/or URI addresses the image requests/content requests were directed. Thus, for example, the module 170 may identify from the logged data that substantially more requests were received at the first URL/URI compared to the second URL/URI or vice-versa, which can trigger the module 170 to notify an operator that a message deliverability problem has occurred.

Example Deliverability Analysis of Emails Grouped by User Information Therein

In some other embodiments, the email transfer module 112 divides (organizes) email messages that are intended for delivery to destination devices into at least two groups of messages. In contrast to the embodiments of FIGS. 2 and 4, the email messages in each of the present groups contain different defined user information. The user information may include, but is not limited to, a telephone number that is to be called by a user to respond to the email message, a particular price for a product and/or service offered by the email message, and/or an account or other reference number that is identified by the email message. The deliverability analysis module 170 can therefore compare the responses that are received using the different user information to identify when there is a deliverability problem associated with one of the groups of email messages.

Figure 5:
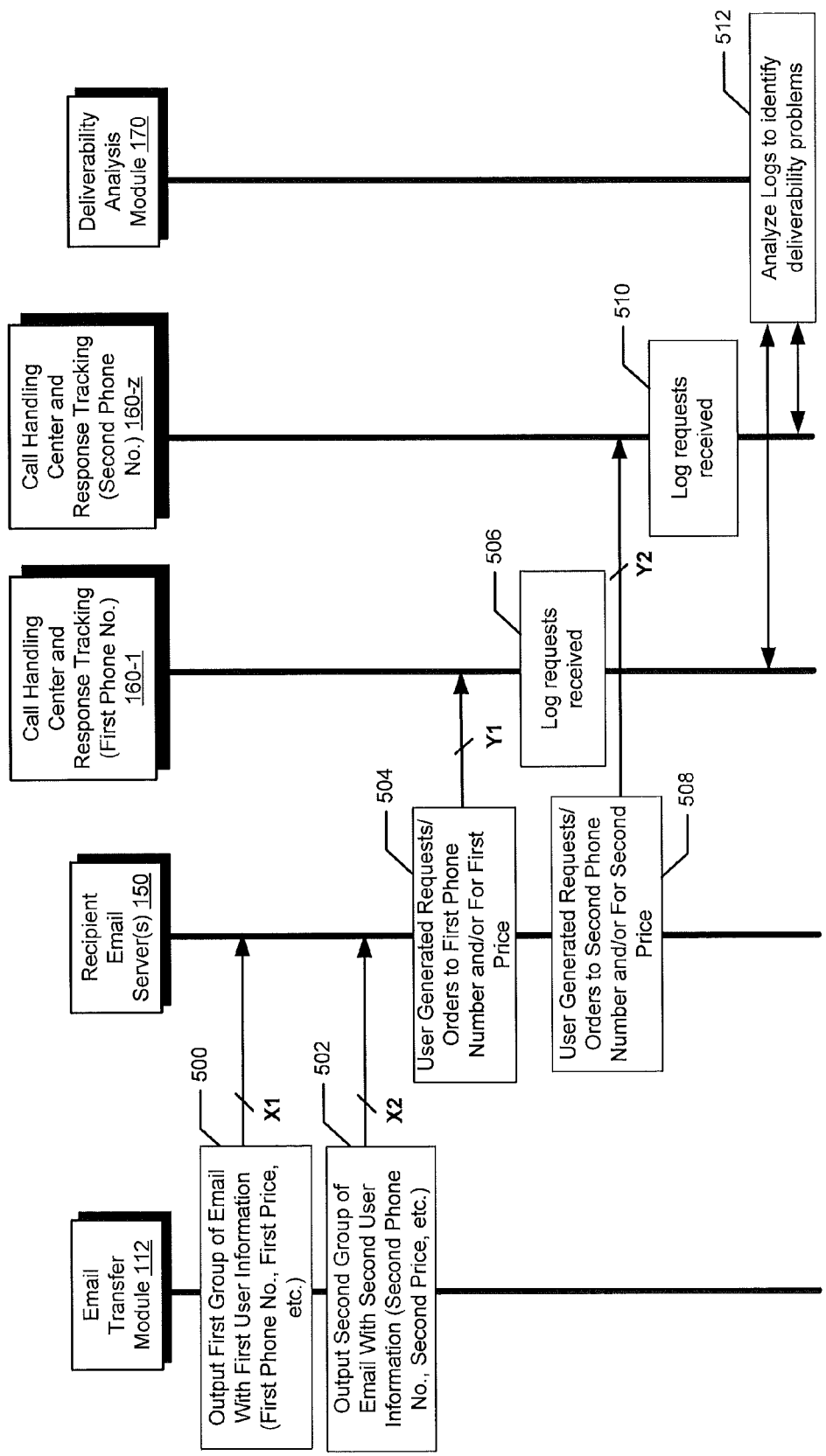
FIG. 5 is a diagram of operations and associated message flows that may be performed by various elements of FIG. 1 to identify message delivery problems according to yet another embodiment described herein.

FIG. 5 is a diagram of operations and associated signal flows that may be performed by various elements of FIG. 1 to group emails by user information contained therein and to identify message delivery problems. The embodiments that are described below for FIG. 5 may be used as an alternative to, or in addition to, the embodiments that are described above for FIGS. 2 and/or 4. Referring to FIGS. 1 and 5, the email transfer module 112 divides the email messages into groups for delivery to the recipient email servers 150 with different user information, which is intended to cause users to generate responses using the defined user information.

As shown in FIG. 5, each email message in a first group (e.g., X1 number of emails) may be communicated (Block 500) with first user information (e.g. a first phone number, a first price, and/or a first reference number). Each email message in a second group (e.g., X2 number of emails) may be communicated (Block 502) with second user information (e.g. a second phone number, a second price, and/or a second reference number). Although not shown, additional email messages may be grouped for communication with each email group having a different user information. Accordingly, the user information that is received responsive to email messages can be used to associate the responses to a particular one of the groups of email messages.

In response to a user receiving an email message in the first group, the user may generate (Block 504) a response using the first information, such as by calling the identified first phone number and/or otherwise referencing the identified first price and/or first reference number. Similarly, in response to a user receiving an email message in the second group, the user may generate (Block 508) a response using the second information, such as by calling the identified second phone number and/or otherwise referencing the identified second price and/or second reference number. Accordingly, as shown in FIG. 1, a user operating terminal 120-1 may respond to an email message in the first group by calling through the network 130 and/or another network 180 (e.g., Public Switched Telephone Network) to one of the response tracking nodes 160-1 (e.g., at a first phone number of a call handling center) that is associated with the first telephone number, and a user operating terminal 120-2 may respond to an email message in the second group by calling through the network 130 and/or the network 180 to another response tracking node 160-z (e.g., at a second phone number of the call handling center) that is associated with the second telephone number.

The nodes 160-1 to 160-z can be configured to log (Blocks 506 and 510) how many user responses (e.g., Y1 received by node 160-1 and Y2 received by node 160-z) that they receive, and/or may log any additional user information from the email messages that is referenced by the user's response (e.g., which of the plurality of defined prices is referenced by each user and/or which of the plurality of reference numbers is referenced by each user).

The deliverability analysis module 170 is configured to use the logged data from the nodes 160 to identify a problem with deliverability of email messages associated with one or more of the groups (Block 512). The deliverability analysis may be carried out as described above regarding Block 214 of FIG. 2 and Block 306 of FIG. 3, except that the associations can now be made based on the user information that is used to generate the response.

Thus, a message deliverability problem can be identified for one of the groups of email messages in response to a comparison of how many of the responses are received at one phone number versus other phone numbers and/or how many responses are received with one price and/or other reference information versus other prices and/or reference information.

Example Deliverability Analysis Using Blending of Grouped Message Characteristics As explained above, the deliverability analysis module 170 may blend together the analysis described above for FIGS. 1-5 to identify email deliverability problems. For example, with reference to FIG. 3, the deliverability analysis module 170 may decide to detect a message deliverability problem based on one or more of the following: 1) comparison of how many responses were logged responsive to email that was sent through the first IP address IP1 relative to how many responses were logged responsive to email that was sent through the second IP address IP2; 2) comparison of how many responses were logged with a first URL/URI relative to how many responses were logged with a second URL/URI; and 3) comparison of how many responses were logged with first user information (e.g., first phone number, a first price, and/or a first reference number) relative to how many responses were logged with second user information (e.g., second phone number, a second price, and/or a second reference number).

The module 170 may also carry out the message deliverability analysis responsive to feedback from seed account monitoring. For example, the module 112 may send emails for one or more of the groups to seed accounts that have been setup at major ISPs. The module 170 may receive feedback from the seed accounts that indicates how many emails were received for each of the groups. The module 170 can use the feedback to compare how many emails in each of the groups were received at the seed accounts and, responsive to the comparisons, can determine when a message delivery problem has occurred. For example, the module 170 may determine that a message delivery problem has occurred when more than a defined difference occurs between the number of emails that are received at the seed accounts across the different groups of emails (e.g., substantially less email of the first group are received at the seed accounts relative to email of the second group).

The module 170 may adjust what threshold range of differences can be observed during each of the comparisons between the compared values before a message deliverability problem is determined to have occurred and a corresponding notification is generated. Moreover, the threshold ranges may be defined to vary over time as a function of historical differences that have been observed for substantially the same time duration, the same time of day, the same day of week, a substantially similar marketing campaign, the same destination devices, and/or the same ISP serving at least some of the same destination devices.

Example Server, Module, Node, and/or Terminal

Figure 6:
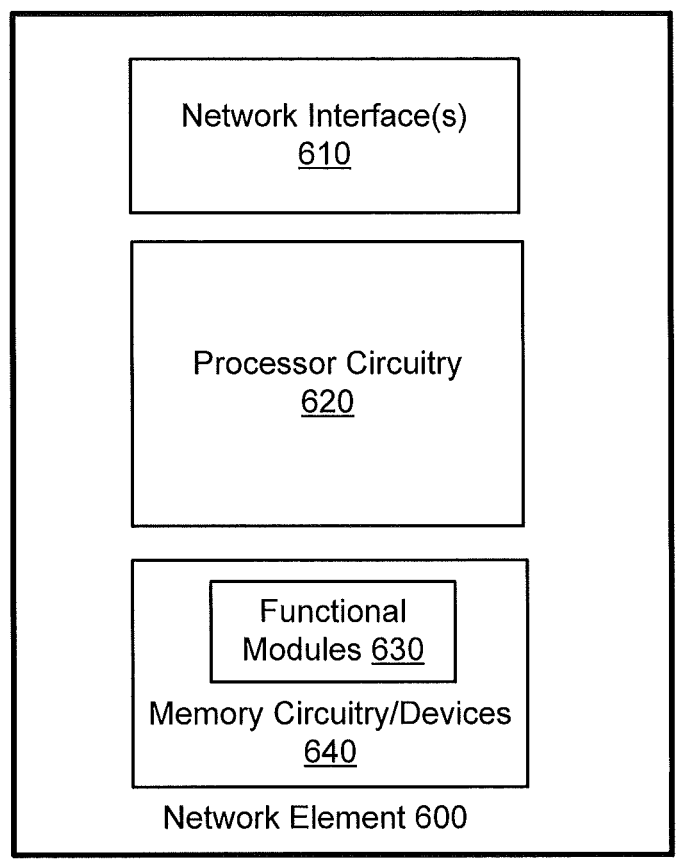
FIG. 6 is a block diagram of example components that may be included in one or more of the network elements illustrated in FIG. 1.

FIG. 6 is a block diagram of example components of a network element 600 that may be included in the source email server 110, the client terminal 120, the ISP 140, the recipient email server 150, the response tracking node 160, and/or the deliverability analysis module 170 of FIG. 1. Referring to FIG. 6, a processor circuit 620 may include one or more instruction execution circuits, such as a general purpose and/or special purpose processor (e.g., microprocessor and/or digital signal processor), that is configured to execute computer program instructions from various functional modules 630 contained in memory circuitry/devices 640, which are described below as a computer readable medium, to operate as explained above with regard to one or more of FIGS. 1-5 for one or more of the servers, modules, nodes, and/or terminals of FIG. 1. A network interface 610 is configured to output and/or receive messages, such as email, image/content requests, and/or other responses, to one or more other elements of FIG. 1 as explained above.

As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an elethent is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Like numbers refer to like elements throughout the description of the figures. It is intended that all embodiments disclosed herein can be implemented separately or combined in any way and/or combination.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A system comprising:
a source email server that is configured to at least:
   divide a plurality of email messages by assigning a first source Internet Protocol (IP) address to a first set of the plurality of email messages and assigning a second source IP address to a second set of the plurality of email messages;
   send the plurality of email messages to a plurality of destination devices; and
   wherein individual ones of the plurality of email messages are configured to trigger a response that includes a corresponding source IP address of a respective email message in response to at least one of an opening of the respective email message or a selection of a hyperlink within the respective email message; and
a deliverability analysis module that is configured to at least identify an email message deliverability problem in response to comparing a first set of received responses associated with the first source IP address with a second set of received responses associated with the second source IP address, the first set of received responses and the second set of received responses being initiated by a trigger in the respective email message.

2. The system of claim 1, wherein:
the first set of the plurality of email messages contain a first hyperlink that is configured to generate a first request for content associated with a first Uniform Resource Identifier (URI), and second set of the plurality of email messages contain a second hyperlink that is configured to generate a second request for content associated with a second URI; and
the deliverability analysis module is further configured to identify the email message deliverability problem in response to comparing a first set of received requests for content at the first URI with a second set of received requests for content the second URI.

3. The system of claim 1, wherein:
individual ones of the first set of the plurality of email messages contain a first image request that is directed to a first Uniform Resource Locator (URL) and is executed in response to opening the respective email message of the first set of the plurality of email messages, and individual ones of the second set of the plurality of email messages contain a second image request that is directed to a second URL and is executed in response to opening a respective email message from the second set of the plurality of email messages; and
the deliverability analysis module is further configured to identify the email message deliverability problem in response to comparing a first amount of a first set of image requests received at the first URL with a second amount of a second set of image requests received at the second URL.

4. The system of claim 1, wherein:
the deliverability analysis module is further configured to identify the email message deliverability problem associated with the first source IP address in response to comparing a received number of the first set of received responses to a historical number of received responses associated with the first source IP address.

5. The system of claim 1, wherein:
the deliverability analysis module is further configured to identify the email message deliverability problem associated with the first source IP address in response to comparing responses received from at least one of a set of the plurality of destination devices or from an Internet Service Provider (ISP) that is serving at least a portion of the plurality of destination devices.

6. A computer-implemented method for identifying a message deliverability problem, comprising:
dividing, by at least one computing device, a plurality of messages intended for delivery to a plurality of destination devices into a first group of messages and a second group of messages, wherein individual ones of the plurality of messages are configured to trigger a response containing information that identifies whether the respective response is associated with the first group of messages or the second group of messages;
transmitting, by the at least one computing device, the plurality of messages to the plurality of destination devices; and
identifying, by the at least one computing device, a message deliverability problem based at least in part on a comparison of the information in a plurality of responses obtained that were triggered by at least a portion of the plurality of messages.

7. The computer-implemented method of claim 6, wherein the plurality of messages comprise at least one of an email message, a Short Message Service (SMS), or a Multimedia Message Service (MMS) message.

8. The computer-implemented method of claim 6, wherein:
the first group of messages are assigned a first source IP address and the second group of messages are assigned a second source IP address;
individual ones of the plurality of messages are configured to trigger a response that contains information identifying a corresponding source IP address of a respective message of the plurality of messages; and
identifying the message deliverability problem comprises identifying the message deliverability problem as being associated with at least one of the first source IP address or the second source IP address by comparing a first plurality of triggered responses that are associated with the first source IP address and a second plurality of triggered responses that are associated with the second source IP address.

9. The computer-implemented method of claim 6, wherein:
dividing the plurality of messages intended for delivery to the plurality of destination devices into the first group of messages and the second group of messages comprises classifying the individual ones of the plurality of messages that contain a user selectable hyperlink that generates a request for content associated with a first Uniform Resource Identifier (URI) into the first group of messages and classifying the individual ones of the plurality of messages that contain a user selectable hyperlink that generates a request for content associated with a second URI into the second group of messages; and
identifying the message deliverability problem comprises identifying the message deliverability problem as being associated with at least one of the first group of messages or the second group of messages in response to a comparison of a number of received requests for content corresponding to the first URI with a number of received requests of content corresponding to the second URI.

10. The computer-implemented method of claim 6, wherein:
dividing the plurality of messages intended for delivery to the plurality of destination devices into the first group of messages and the second group of messages comprises: classifying the individual ones of the plurality of messages that contain a first image request that is directed to a first Uniform Resource Locator (URL) and is executed in response to opening a respective message with the first group of messages; and
classifying the individual ones of the plurality of messages that contain a second image request that is directed to a second Uniform Resource Locator (URL) and is executed in response to opening a respective message with the second group of messages; and
identifying the message deliverability problem comprises identifying the message deliverability problem as being associated with at least one of the first group of messages or the second group of messages in response to a comparison of a number of received image requests corresponding to the first URL with a number of received image requests corresponding to the second URL.

11. The computer-implemented method of claim 6, wherein:
dividing the plurality of messages intended for delivery to the plurality of destination devices into the first group of messages and the second group of messages comprises: classifying the individual ones of the plurality of messages that contain first user information with the first group of messages and classifying the individual ones of the plurality of messages that contain second user information with the second group of messages; and
identifying the message deliverability problem comprises identifying the message deliverability problem as being associated with at least one of the first group of messages or the second group of messages in response to a comparison of a first plurality of responses received from users using the first user information with a second plurality of responses received from users using the second user information.

12. The computer-implemented method of claim 11, wherein:
dividing the plurality of messages intended for delivery to the plurality of destination devices into the first group of messages and the second group of messages comprises: classifying the individual ones of the plurality of messages that contain a first telephone number with the first group of messages, and classifying the individual ones of the plurality of messages that contain a second telephone number with the second group of messages; and
identifying the message deliverability problem comprises identifying the message deliverability problem as being associated with at least one of the first group of messages or the second group of messages in response to a comparison of a first plurality of received responses from users using the first telephone number with a second plurality of received responses from users using the second telephone number.

13. The computer-implemented method of claim 11, wherein:
dividing the plurality of messages intended for delivery to the plurality of destination devices into the first group of messages and the second group of messages comprises: classifying into the first group of messages, the individual ones of the plurality of messages that contain first reference information that is to be referenced by a respective user when responding to a respective message from the first group of messages and classifying into the second group of messages, the individual ones of the plurality of messages that contain second reference information that is to be referenced by the respective user when responding to a respective message from the second group of messages; and identifying the message deliverability problem comprises identifying the message deliverability problem as being associated with the first group of messages or the second group of messages in response to a comparison of a first plurality of received responses referring to the first reference information with a second plurality of received responses referring to the second reference information.

14. The computer-implemented method of claim 6, wherein identifying the message deliverability problem is carried out in response to an occurrence of receipt of a threshold number of the plurality of responses that are associated with at least one of the first group of messages and the second group of messages.

15. The computer-implemented method of claim 6, wherein identifying the message deliverability problem is responsive to a comparison of a first plurality of responses received for at least one of the first group of messages or the second group of messages to a historical number of a second plurality of responses that were received during an earlier at least substantially non-overlapping time duration.

16. The computer-implemented method of claim 6, wherein identifying the message deliverability problem is responsive to a comparison of a first plurality of responses received for at least one of the first group of messages or the second group of messages of messages to a historical number of a second plurality of responses that were received during a substantially same time of an earlier day.

17. The computer-implemented method of claim 6, wherein identifying the message deliverability problem is responsive to a comparison of a first plurality of responses received for at least one of the first group of messages or the second group of messages to a historical number of a second plurality of responses that were received during a same day of an earlier week.

18. The computer-implemented method of claim 6, wherein identifying the message deliverability problem is responsive to a comparison of a first plurality of responses received for at least one of the first group of messages or the second group of messages to a historical number of a second plurality of responses that were received for a substantially similar marketing campaign being carried out via the plurality of messages.

19. The computer-implemented method of claim 6, wherein identifying the message deliverability problem is responsive to a comparison of a first plurality of responses received for at least one of the first group of messages or the second group of messages to a historical number of a second plurality of responses that were received from at least one same destination device.

20. The computer-implemented method of claim 6, wherein identifying the message deliverability problem is responsive to a comparison of a first plurality of responses received for at least one of the first group of messages or the second group of messages to a historical number of a second plurality of responses that were received from at least one same Internet Service Provider (ISP) that is serving at least some of the plurality of destination devices.

21. A computer program product for identifying a message deliverability problem, the computer program product comprising a non-transitory computer-readable medium having executable computer-readable program code therein, the computer-readable program code being configured to:

divide a plurality of messages intended for delivery to a plurality of destination devices into a first group of messages and a second group of messages, wherein individual ones of the plurality of messages are configured to trigger a response containing information that identifies whether the respective response is associated with the first group of messages or the second group of messages;

transmit the plurality of messages to the plurality of destination devices;

obtain a plurality of responses triggered by a least a portion of the plurality of messages; and identify a message deliverability problem based at least in part on a comparison of the information in the plurality of responses.

22. A computer-implemented method for identifying a message deliverability problem, comprising:

receiving, in at least one computing device, a plurality of responses from a plurality of destination devices, the plurality of responses being associated with at least one of a first group of messages or a second group of messages, and individual ones of the plurality of responses including information that identifies whether a respective message that generated a respective response is associated with the first group of messages or the second group of messages; and identifying, in the at least one computing device, a message deliverability problem associated with at least one of the first group of messages or the second group of messages in response to a comparison of the information in the plurality of responses.

23. The computer-implemented method of claim 22, wherein:

receiving the plurality of responses from the plurality of destination devices comprises receiving at a first Uniform Resource Identifier (URI) a first set of responses containing a first content request which is generated by at least a portion of the messages in the first group of messages and receiving at a second URI a second set of responses containing a second content request which is generated by at least a portion of the messages in a second group of messages; and identifying the message deliverability problem comprises identifying the message deliverability problem as being associated with at least one of the first group of messages or the second group of messages in response to comparing how many of the plurality of responses containing at least one of the first content request or the second content request are received at the first URI and the second URI.

24. The computer-implemented method of claim 22, wherein:

receiving the plurality of responses from the plurality of destination devices comprises receiving at a first Uniform Resource Locator (URL) a first set of responses containing a first image request which is generated by at least a portion of the messages in the first group of messages and receiving at a second URL a second set of responses containing a second image request which is generated by at least a portion of the messages in a second group of messages; and identifying the message deliverability problem comprises identifying the message deliverability problem as being associated with at least one of the first croup of messages or the second group of messages in response to comparing how many of the plurality of responses containing at least one of the first image request or the second image request are received at the first URL and the second URL.

25. The computer-implemented method of claim 22, wherein:
receiving the plurality of responses from the plurality of destination devices comprises:
receiving a first set of responses containing a first source Internet Protocol (IP) address which is associated with the first group of messages and receiving a second set of responses containing a second source IP address which is associated with the second group of messages; and
identifying the message deliverability problem comprises identifying the message deliverability problem as being associated with at least one of the first group of messages or the second group of messages in response to comparing a first number of responses received in the first set of responses with a second number of responses received in the second set of responses.

26. The computer-implemented method of claim 22, wherein identifying the message deliverability problem is responsive comparing a current number of the plurality of responses received for at least one of the first group of messages or the second group of messages to a historical number of responses that were received during at least one of a substantially same time of an earlier day or a same day of an earlier week.

27. The computer-implemented method of claim 22, wherein identifying the message deliverability problem is responsive to comparing a current number of the plurality of responses received for at least one of the first group of messages or the second group of messages to a historical number of responses that were received from at least one of at least one same destination device or from at least one same Internet Service Provider (ISP) that is serving at least one of the plurality destination devices.

* * * * *